United States Patent [19]

Mitzlaff

[11] Patent Number: 5,353,301
[45] Date of Patent: Oct. 4, 1994

[54] METHOD AND APPARATUS FOR COMBINING MULTIPATH SPREAD-SPECTRUM SIGNALS

[75] Inventor: James E. Mitzlaff, Arlington Heights, Ill.

[73] Assignee: Motorola, Inc., Schaumburg, Ill.

[21] Appl. No.: 123,497

[22] Filed: Sep. 17, 1993

[51] Int. Cl.[5] .............................................. H04K 1/00
[52] U.S. Cl. ........................................ 375/1; 380/34
[58] Field of Search .............................. 375/1; 380/34

[56] References Cited

U.S. PATENT DOCUMENTS

| | | |
|---|---|---|
| 4,032,847 | 6/1977 | Unkauf . |
| 4,109,100 | 8/1978 | Unkauf . |
| 4,616,364 | 10/1986 | Lee .................................. 375/1 |
| 4,998,261 | 3/1991 | van Driest et al. . |
| 5,161,168 | 11/1992 | Schilling ............................ 375/1 |
| 5,185,762 | 2/1993 | Schilling ............................ 375/1 |
| 5,224,120 | 6/1993 | Schilling ............................ 375/1 |
| 5,228,053 | 7/1993 | Miller et al. ...................... 375/1 |
| 5,237,587 | 8/1993 | Schoolcraft ....................... 375/1 |
| 5,258,995 | 11/1993 | Su et al. ............................ 375/1 |

OTHER PUBLICATIONS

Turin, George L., "Introduction to Spread-Spectrum Antimultipath Techniques and Their Application to Urban Digital Radio", Proceedings of the IEEE, vol. 68, No. 3, Mar. 1980, pp. 328-353.

Freret et al., "Applications of Spread-Spectrum Radio to Wireless Terminal Communications", National Telecom Conference, 1980, pp. 69.7.1-69.7.4.

Kavehrad, M. and Bodeep, G. E., "An Experience with Direct-Sequence Spread Spectrum Using Differential Phase Shift Keying Modulation", 1987 IEEE, pp. 3.5.1-3.5.5.

Dixon, Robert C., Spread Spectrum Systems, Second Edition, 1984 by John Wiley & Sons, Inc., Chapter 1, "The What and Whys of Spread Spectrum Systems", Chapter 2, Spread Spectrum Techniques, and Chapter 6, Synchronization.

Unkauf, Dr. Manfred G., Military Communications, "Digital Troposcatter Communications System", Oct. 1988, pp. 69-76.

Tuch, Bruce, NCR Systems Engineering B.V. Submission to IEEE 802.4L, Through-The-Air Token Bus Physical Layer, Nov. 5, 1989, "DQPSK Spread-Spectrum Modulation/Demodulation".

Price, R. and Green, Jr., P. E., Proceedings of the IRE, "A Communication Technique for Multipath Channels", 1958, pp. 555-570.

Pahlavan, K., "Spread Spectrum for Wireless Local Networks", 1987 IEEE, pp. 215-219.

Proakis, J. G., Digital Communications, (Second Edition), New York: McGraw-Hill, 1989, pp. 265-272.

Primary Examiner—David C. Cain
Attorney, Agent, or Firm—Shawn B. Dempster

[57] ABSTRACT

A method and apparatus for combining multipath spread-spectrum signals are provided. The multipath combining is accomplished by detecting an envelope of an input differential phase shift keyed signal communicated over a communication channel. Subsequently, a replica of a multipath echo structure for the communication channel is detected within the detected envelope. In addition, a multipath echo structure weighted differential phase shift keyed signal with the detected replica of the multipath echo structure for the communication channel. Finally, the multipath echo structure weighted differential phase shift keyed signal is integrated over a one symbol period centered on a correlation peak such that power from a plurality of signal paths determines an output data bit.

21 Claims, 3 Drawing Sheets

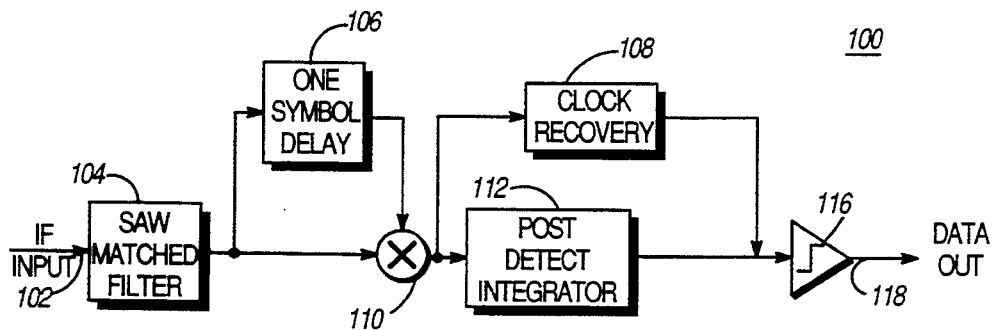
FIG.1 -PRIOR ART-
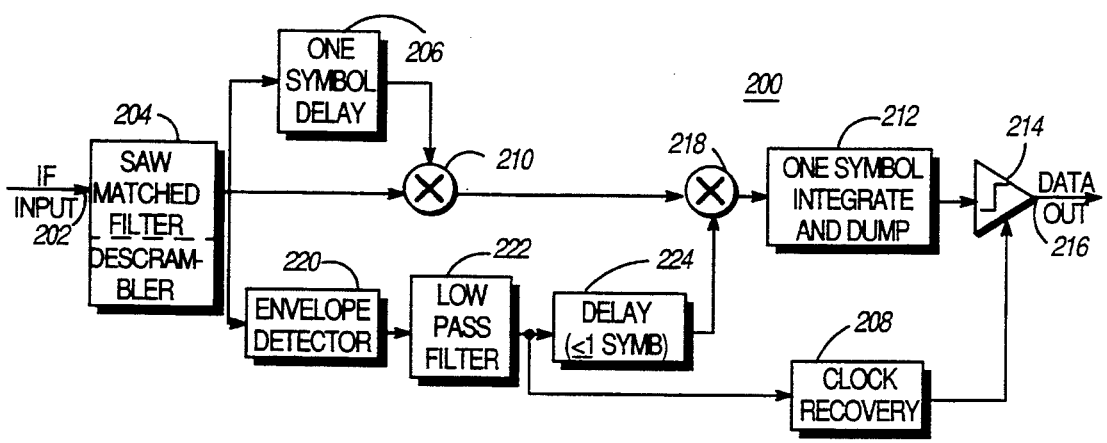
FIG.2
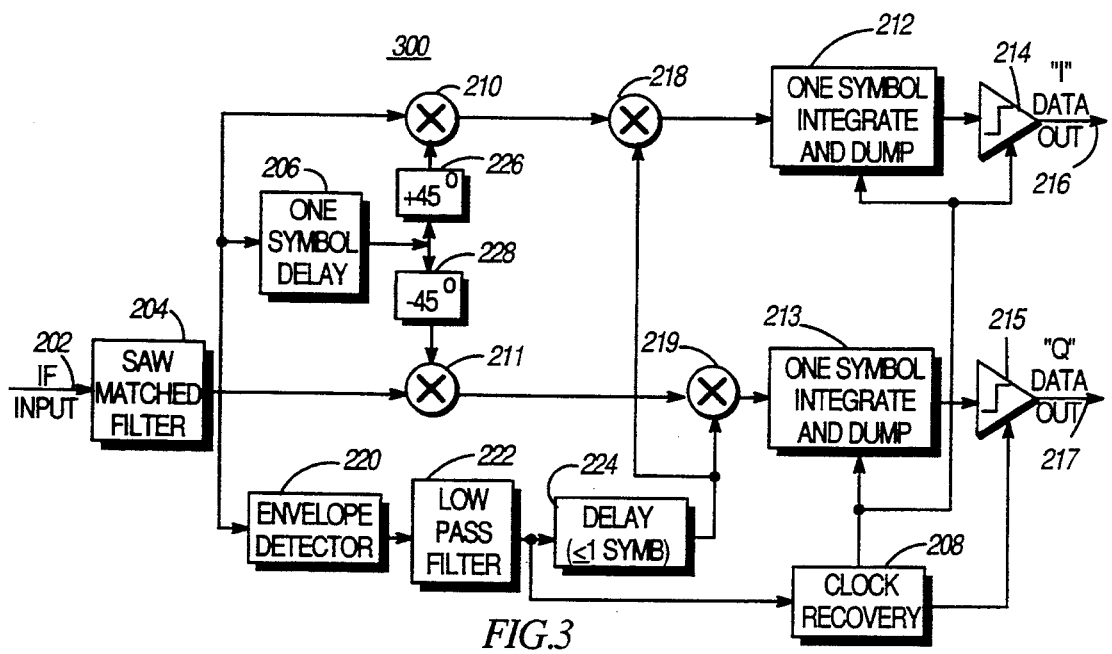
FIG.3

METHOD AND APPARATUS FOR COMBINING MULTIPATH SPREAD-SPECTRUM SIGNALS

FIELD OF THE INVENTION

The present invention relates to communication systems which employ spread-spectrum signals and, more particularly, to a method and apparatus for combining multipath spread-spectrum signals.

BACKGROUND OF THE INVENTION

In general, the purpose of a communication system is at transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. A channel may consist of wirelines (e.g., local telephone transmission), optical fibers, microwave links, infrared frequency links, and radio frequency (RF) links. The function of the receiver is to process the received signal so as to produce an estimate of the original message signal. This processing of the received signal is referred to as demodulation.

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, and improved security of communication through the use of encryption. These advantages are attained at the cost of increased transmission (channel) bandwidth and increased system complexity. Through the use of very large-scale integration (VLSI) technology a cost-effective way of building the hardware has been developed.

One digital transmission method that may be used for the transmission of message signals over a communication channel is pulse-code modulation (PCM). In PCM, the message signal is sampled, quantized, and then encoded. The sampling operation permits representation of the message signal by a sequence of samples taken at uniformly spaced instants of time. Quantization trims the amplitude of each sample to the nearest value selected from a finite set of representation levels. The combination of sampling and quantization permits the use of a code (e.g., binary code) for the transmission of a message signal. Other forms of digital transmission use similar methods to transmit message signals over a communication channel.

When message signals are digitally transmitted over a band limited channel, a form of interference known as intersymbol interference may result. The effect of intersymbol interference, if left uncontrolled, is to severely limit the rate at which digital data may be transmitted without error over the channel. The cure for controlling the effects of intersymbol interference may be controlled by carefully shaping the transmitted pulse representing a binary symbol 1 or 0.

Further, to transmit a message signal (either analog or digital) over a bandpass communication channel, the message signal must be manipulated into a form suitable for efficient transmission over the channel. Modification of the message signal is achieved by means of a process termed modulation. This process involves varying some parameter of a carrier wave in accordance with the message signal in such a way that the message information is preserved and that the spectrum of the modulated wave contained in the assigned channel bandwidth. Correspondingly, the receiver is required to re-create the original message signal from a degraded version of the transmitted signal after propagation through the channel. The re-creation is accomplished by using a process known as demodulation, which is the inverse of the modulation process used in the transmitter. Some of the more common forms of modulation include phase shift keying (PSK), binary phase shift keying (BPSK), quadrature phase shift keying (QPSK), differential phase shift keying (DPSK), and frequency shift keying (FSK).

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference. Typically, in propagating through a channel, the transmitted signal is distorted because of nonlinearities and imperfections in the frequency response of the channel. Other sources of degradation are noise and interference added to the received signal during the course of transmission through the channel. Noise and distortion constitute two basic limitations in the design of communication systems. There are various sources of noise, internal as well as external to the system. Although noise is random in nature, it may be described in terms of its statistical properties such as the average power or the spectral distribution of the average power.

In any communication system, there are two primary communication resources to be employed, namely, average transmitted power and channel bandwidth. The average transmitted power is the average power of the transmitted signal. The channel bandwidth defines the range of frequencies that the channel uses for the transmission of signals with satisfactory fidelity. A general system design objective is to use these two resources as efficiently as possible. In most channels, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitted power determines the signal-to-noise ratio at the receiver input. This, subsequently, determines the noise performance of the receiver. Unless this performance exceeds a certain design level, the transmission of message signals over the channel is not considered to be satisfactory.

Additionally, channel bandwidth is important; because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

One particular type of communication system which optimizes these communication resources particularly well is spread-spectrum communication systems. In spread-spectrum systems, a modulation technique is utilized in which a transmitted signal is spread over a wide frequency band. The frequency band is wider than the minimum bandwidth required to transmit the information being sent. A voice signal, for example, can be sent with amplitude modulation (AM) in a bandwidth only twice that of the information itself. A spread-spectrum system, on the other hand, often takes a baseband signal (e.g., a voice channel) with a bandwidth of only a few kilohertz, and distributes it over a band that may be many megahertz wide. This is accomplished by modulating with the information to be sent and with a wideband encoding signal. Through the use of spread-spectrum modulation, a message signal may be transmitted in a channel in which the noise power is higher than the signal power. The modulation and demodulation of the message signal provides a signal-to-noise gain which enables the recovery of the message signal from a noisy channel, The greater the signal-to-noise ratio for a given system equates to: (1) the smaller the bandwidth required to transmit a message signal with a low rate of error or (2) the lower the average transmitted power required to transmit a message signal with a low rate of error over a given bandwidth.

Three general types of spread-spectrum communication techniques exist, including direct sequence, frequency/time hopping, and chirp modulation. In direct sequence modulation, a carder is modulated by a digital code sequence whose bit rate is much higher than the information signal bandwidth. In frequency/time hopping modulation, the carrier frequency or time of transmission is shifted in discrete increments in a pattern dictated by a code sequence. The transmitter jumps from frequency to frequency (or time slot to time slot) within some predetermined set; the order of frequency (or time slot) usage is determined by a code sequence. Finally, in chirp modulation, a carder is swept over a wide band during a given pulse interval.

Information (i.e., the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code, typically a binary code, involves modulo-2 addition. Alternatively, the information or message signal may be used to modulate a carrier before spreading it.

The essence of the spread-spectrum communication involves the art of expanding the bandwidth of a signal, transmitting the expanded signal and recovering the desired signal by remapping the received spread-spectrum into the original information bandwidth. Furthermore, in the process of carrying out this series of bandwidth trades, the purpose of spread-spectrum techniques is to allow the system to deliver information with low error rates in a noisy signal environment.

Referring now to FIG. 1. a prior art direct-sequence spread-spectrum (DS-SS) communications receiver structure 100 intended for use in an indoor wireless data network is shown. This receiver 100 is designed to receive signals which utilize DPSK as the basic data modulation scheme, which is then spread by multiplying the data signal by a fixed, binary non-return to zero (NRZ) spreading code with good autocorrelation properties, such as the well known Barker, pseudo-noise (PN), or Gold code sequences. The use of DPSK signaling and a fixed spreading code has enabled the communication system to use a very simple receiver structure 100 as shown in shown in FIG. 1. This receiver structure 100 is merely a classic DPSK receiver with the addition of a surface acoustic wave (SAW) matched filter 104 operating within an intermediate frequency (IF) region. This matched filter 104 is used to despread the incoming signal 102 prior to demodulation. The despread signal is input to one input of a multiplier 110. In addition, a delayed version of the despread signal (i.e., passed through a mechanism 106 which delays the despread signal by one symbol) is input to another input of the multiplier 110. The product of this multiplication is input to an integrator 112. The integrator 112 generates and outputs a signal by integrating the multipath echo structure weighted DPSK signal over a one symbol period centered on a correlation peak such that power from a plurality of signal paths determines an output data bit 116. This output signal is then passed through a comparator 114 which is triggered by a clock signal recovered 108 from the incoming signal 102. The comparator 114 detects the positive values from the output signal as a logical "1" output data bit 116 and the negative or zero values from the output signal as a logical "0" output data bit 116.

In addition to being inexpensive to build using current technology, this receiver structure 100 has many other attractive features. It can support high data rates if short spreading codes are used. It can also provide a modest amount of multipath suppression, since it is able to resolve and combine any echoes which are separated in time by more than one "chip" period, but less than one symbol period. However, the multipath combining scheme used in this receiver, that is the simple post-detection integration, is not an optimum scheme. Improving this combining scheme would provide the following benefits:

Improved receiver sensitivity and interference rejection in "low multipath" environments;

Improved resistance to outage in "severe multipath" environments, i.e. where the delay spread approaches (or even moderately exceeds) one symbol period; and Increased number of users allowed in a code division multiple access system, for a given allowable error rate specified.

SUMMARY OF THE INVENTION

A method and apparatus for combining multipath spread-spectrum signals are provided. The multipath combining is accomplished by detecting an envelope of an input differential phase shift keyed signal communicated over a communication channel. Subsequently, a replica of a multipath echo structure for the communication channel is detected within the detected envelope. In addition, a multipath echo structure weighted differential phase shift keyed signal is formed by combining the input differential phase shift keyed signal with the detected replica of the multipath echo structure for the communication channel. Finally, the multipath echo structure weighted differential phase shift keyed signal is integrated over a one symbol period centered on a correlation peak such that power from a plurality of signal paths determines an output data bit.

BRIEF DESCRIPTION OF THE DRAWINGS

FIG. 1 is a diagram showing a poor art multipath combiner for use in a spread-spectrum signal receiver.

FIG. 2 is a diagram showing a preferred embodiment improved multipath combiner for use in a spread-spectrum signal receiver in accordance with the present invention.

FIG. 3 is a diagram showing the preferred embodiment improved multipath combiner as shown in FIG. 2 configured to operate in a differential quadrature phase shift keyed spread-spectrum signal receiver in accordance with the present invention.

DETAILED DESCRIPTION

Figure 4:
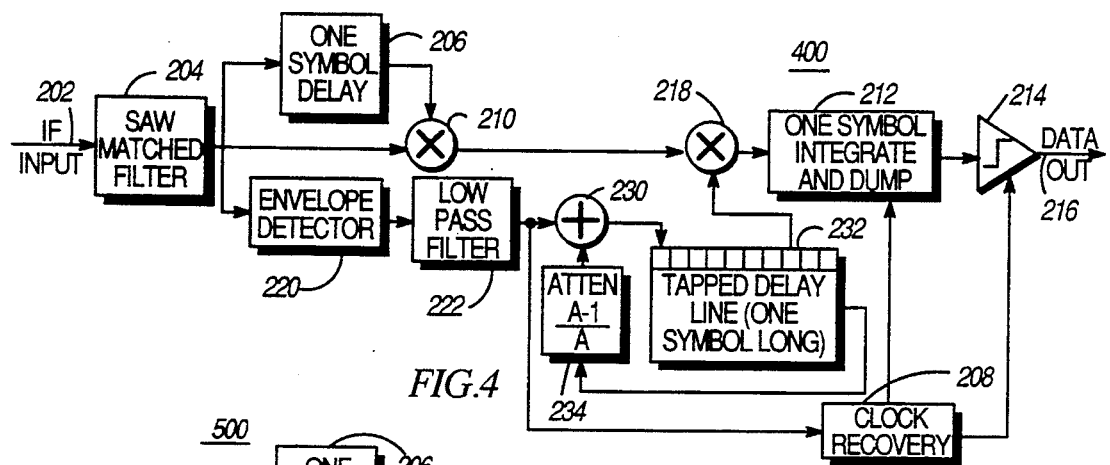
FIG. 4 is a diagram showing an alternative preferred embodiment improved multipath combiner for use in a spread-spectrum signal receiver in accordance with the present invention.

Referring now to FIG. 2, an improved echo combined for a DPSK-DS-SS receiver 200 is shown. This receiver 200 exploits the fact that the envelope of the IF output from the matched filter 204 contains a replica of the multipath "echo structure" present in the radio channel. This phenomena was described as well as shown in oscilloscope photos by M. Kavehrad and G. E. Bodeep, "An Experiment with Direct-Sequence Spread Spectrum Using Differential Phase Shift Keying Modulation for Indoor Wireless Communications," *ICC '87*, p.p. 3.5.1–3.5.5 and G. L. Turin, "Applications of Spread-Spectrum Antimultipath Techniques and Their Application to Urban Digital Radio," *Proc. IEEE.*, vol. 68, no. 3, p.p. 328–353, March 1980. However, neither Kavehrad et al. nor Turin exploited this phenomena to improve performance of a DPSK-DS-SS receiver.

Receiver 200, like the prior art receiver 100 is designed to receive signals which utilize DPSK as the basic data modulation scheme. The signals are also spread by multiplying the data signal by a fixed, binary non-return to zero (NRZ) spreading code with good autocorrelation properties, such as the well known Barker, pseudo-noise (PN), or Gold code sequences. To receive the spread-spectrum signal, the receiver structure 200 includes a descrambling surface acoustic wave (SAW) matched filter 204 which is tuned to operate within an intermediate frequency (IF) region. This matched filter 204 is used to despread the incoming signal 202 prior to demodulation. This despreading is accomplished by convolving a time reversed spreading code with a signal received from over a communication channel, which retrieves the originally input DPSK signal from the received spread-spectrum signal 202. It will be appreciated by those skilled in the art that the communication channel may be formed from any one of several types including an electronic data bus, a radio communication link, a wireline and/or an optical fiber link. in addition, the SAW matched filter 204 detects an envelope of the input DPSK signal.

The despread input DPSK signal is input to one input of a multiplier/combiner 210. In addition, a delayed version of the despread input DPSK signal (i.e., passed through a delay mechanism 206 which delays the despread signal by one symbol) is input to another" input of the multiplier/combiner 210. The product of this multiplication (i.e., a combined input DPSK signal) is input to another multiplier/combiner 218.

At the same time, an IF envelope detector 220 (preferably square law type) is operatively coupled to the SAW matched filter 204. The IF envelope detector 220 detects a replica of a multipath echo structure for the communication channel within the envelope detected by the SAW matched filter 204. Subsequently, a low pass filter 222 is used to remove IF frequency (and harmonic) components from the envelope detector output. It's 222 cutoff frequency preferably is set to about midway between the IF frequency and the spreading code "chip rate" frequency associated with the input differential phase shift keyed signal 202. In addition, a delay line 224 is then used to time align (delay up to one symbol period) the echo structure coming from the filtered envelope detector output so that it is properly synchronized with the demodulator (first multiplier 210) output when it arrives at the second multiplier 218.

Multiplier/combiner 218 "weights" the DPSK demodulator output (from the first combiner 210) according to the strength of the associated "echo". This is accomplished by combining the combined input differential phase shift keyed signal with the delayed low pass filtered detected replica of the multipath echo structure for the communication channel such that a multipath echo structure weighted differential phase shift keyed signal is formed. Subsequently, multipath combining is accomplished by integrating this echo weighted signal over one symbol period, using an integrate and dump circuit 212. Integrator 212 generates and outputs a signal by integrating the multipath echo structure weighted DPSK signal over a one symbol period centered on a correlation peak such that power from a plurality of signal paths determines an output data bit 216. This output signal is then passed through a comparator 214 which is triggered by a clock signal recovered 208 from the incoming signal 202 after it has been despread, envelope detected, and low pass filtered. The comparator 214 detects the positive values from the output signal as a logical "1" output data bit 21 6 and the negative or zero values from the output signal as a logical "0" output data bit 216. The net effect of this system is to turn the "equal gain" multipath combiner used in the prior art approaches as shown in FIG. 1 into a "max. ratio" combiner as shown in FIG. 2.

The receiver structures shown in FIGS. 1 and 2 should be referred to as DBPSK (differential binary phase shift keying) DS-SS receiver. The additional circuitry shown in FIG. 2. can, however, also be used to improve multipath combining in a DQPSK (differential auadrature phase shift keying) DS-SS receiver. This is shown in FIG. 3., where the basic DQPSK receiver structure (e.g., as described by J. G. Proakis, *Digital Communications* (2nd Ed.), New York: McGraw-Hill, 1989). In order to keep matters simple, all subsequent discussions of enhanced multipath combiner structures will focus on the DBPSK-DS-SS case. The corresponding combiner structure for the DQPSK-DS-SS receiver can always be derived by parallel connections from the "weighting" and clock recovery circuits into both the "I" and "Q" branches of the demodulator, as is shown in FIG. 3.

More precisely, the DQPSK multipath combiner shown in FIG. 3 operates in a substantially similar manner to the DBPSK multipath combiner shown in FIG. 2, except that the DQPSK multipath combiner 300 includes circuitry necessary to recover both an I-channel component and a Q-channel component from the input DQPSK signal 202. After despreading the input DQPSK signal, the input DQPSK signal is input to one input of an I-channel multiplier/combiner 210 and one input of a Q-channel multiplier/combiner 211. In addition, a delayed version of the despread input DQPSK signal (i.e., passed through a delay mechanism 206 which delays the despread signal by one symbol) is split into an I-channel and Q-channel component by 45° phase converters 226 and 228, respectively. These I-channel and Q-channel components are input to another input of the multiplier/combiner 210 and 211, respectively. The product of this multiplication (i.e., a combined input DPSK signal) is input to another multiplier/combiner 21 8 and 219, respectively.

I-channel combiner 218, which is also operatively coupled to the envelope detector 220, combines an I-channel component of the input differential quadrature phase shift keyed signal with the detected replica of the multipath echo structure for the communication channel such that a multipath echo structure weighted I-channel differential quadrature phase shift keyed signal is formed. I-channel integrator 212 integrates the multipath echo structure weighted I-channel differential phase shift keyed signal over a one symbol period centered on a correlation peak such that power from a plurality of signal paths determines an output I-channel data bit 216. This output signal is then passed through an I-channel comparator 214 to detect the output I-channel data bit 216 which is triggered by a clock signal recovered 208 from the incoming signal 202 after it has been low pass filtered.

Similarly, Q-channel combiner 219, which is also operatively coupled to the envelope detector 220, combines a Q-channel component of the input differential quadrature phase shift keyed signal with the detected replica of the multipath echo structure for the communication channel such that a multipath echo structure weighted Q-channel differential quadrature phase shift keyed signal is formed. Q-channel integrator 213 integrates the multipath echo structure weighted Q-channel differential phase shift keyed signal over a one symbol period centered on a correlation peak such that power from a plurality of signal paths determines an output Q-channel data bit 217. This output signal is then passed through a Q-channel comparator 215 to detect the output Q-channel data bit 217 which is triggered by a clock signal recovered 208 from the incoming signal 202 after it has been low pass filtered.

An even more effective, DPSK multipath combiner 400 is shown in FIG. 4 which operates in a substantially similar manner to the DPSK multipath combiner 200 shown in FIG. 2. However, in multipath combiner 400, the tapped delay line 232, attenuator 234 which attenuates according to the function A-1/A, and summer 232 form a recirculating exponential averager having a decay period of A symbols. This device continuously circulates a one symbol long replica of an average detected replica of the multipath echo structure, which is then used to weight the output of the DPSK detector (i.e., through combiner 218) prior to combining the various multipath components in the integrate and dump circuit 212. This averaging process reduces the amount of noise in the detected replica of the multipath echo structure, which leads to a more accurate and effective combining of the various multipath components.

It will be appreciated by those skilled in the art that while the recirculating averager is depicted as an analog circuit in FIG. 4, it can also be implemented using digital circuitry. To accomplish this an analog-to-digital (A/D) converter would need to be added between the low pass filter 222 output and the summer 230 input. In addition, a digital-to-analog (D/A) converter must be added between the delay line 232 output and the multiplier/combiner 218 input. Further, the digital circuit may require a (preferably chip rate) clock to advance the shift register delay line and strobe the A/D and D/A converters. This digital averager would be much more stable than its analog counterpart, since the digital circuitry would not be affected by gain variations, which can make the analog averager turn into an oscillator. On the other hand, the need for data converters and a shift register which can operate at chip rate (which could approach 1 GHz in a high speed system) can make the digital approach very costly and power-hungry.

Figure 5:
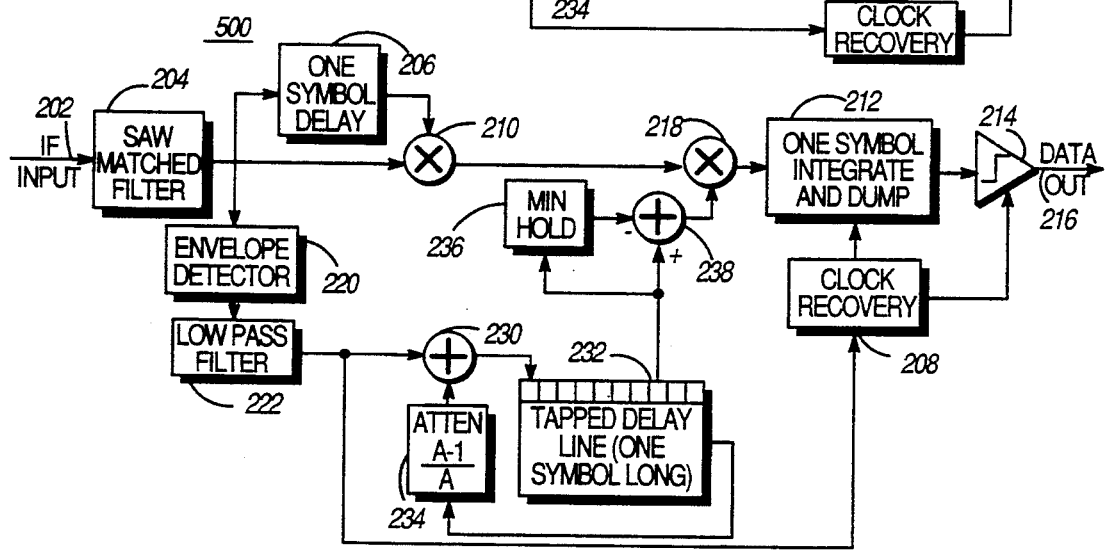
FIG. 5 is a diagram showing the alternative preferred embodiment improved multipath combiner shown in FIG. 4 with a minimum hold circuit included in accordance with the present invention.

Yet another improvement is shown in FIG. 5 by the DPSK multipath combiner 500 which operates in a substantially similar manner to the DPSK multipath combiner 400 shown in FIG. 4. DPSK multipath combiner 500 includes a "minimum hold" circuit 236 is used to estimate a multipath echo structure "noise floor" from the detected replica of the multipath echo structure. This "noise floor" level is then subtracted 238 from the echo structure output before it is applied to the multiplier/combiner 218, thus completely "turning off" the combiner 218 (i.e., mixing in no echo structure signal) when there is no discernible signal present. The net effect of all this "minimum hold" circuitry 236 and 238 is to produce a one symbol long "RAKE" combiner which is an "optimum" multipath combiner for channels where the delay spread does not (significantly) exceed one symbol period.

Figure 9:
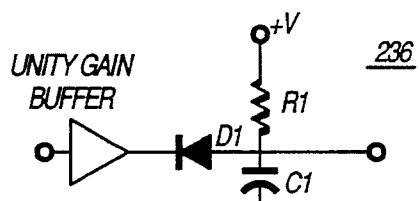
FIG. 9 is a diagram showing a preferred embodiment minimum hold circuit which can be used in the improved multipath combiner shown in FIGS. 5, 6, 7, and 8 in accordance with the present invention.

One simple and effective "minimum hold" circuit 236 is the "leaky integrator" which is shown in FIG. 9. Here the holding capacitor (C1) is slowly being charged through resistor (R1), but will be rapidly discharged through diode (D1) by any signal minima which appear at the output of the unity gain buffer. This circuit 236 can even be set up to track a time varying "noise floor by setting the R1C1 time constant to around ten to one hundred symbol periods. However, in some applications the time constant, R1 C1 should be set rather low to around three to ten symbol periods. This low setting of R1C1 will speed up circuit recovery when transient nulls in the IF envelope (due to channel noise, interference, or multipath) pull down the "noise floor" estimate. It might also help to add a resistor, R2, in series with D1. R2 should be chosen such that the time constant R2C1 is around one chip period. This will help to "filter out" transient nulls, thus producing a better estimate of the average "noise floor".

Figure 6:
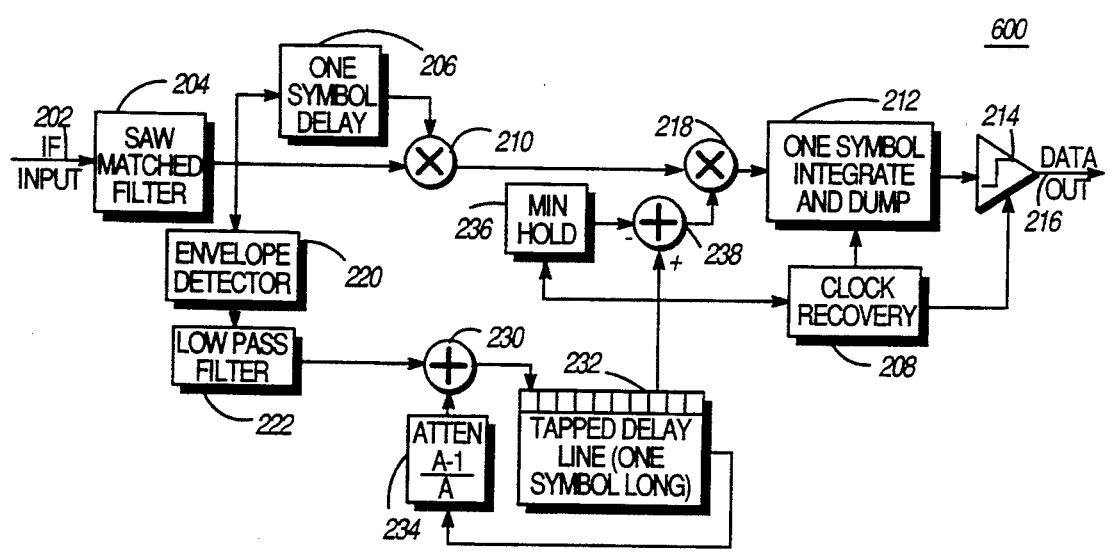
FIG. 6 is a diagram showing the alternative preferred embodiment improved multipath combiner shown in FIG. 5 with a clock recovery circuit coupled to the envelope detector in an alternative location in accordance with the present invention.

It will be appreciated by those skilled in the art that it may be desirable to modify the DPSK multipath combiner 500 shown in FIG. 5 to recover a clock signal 208 from the input DPSK signal after the recirculating exponential averager has reduces noise in the signal (i.e., tap the clock recovery circuit from the delay line 232). Other than modifying the tap for the clock recovery, the DPSK multipath combiner 500 shown in FIG. 6 which operates in a substantially similar manner to the DPSK multipath combiner 500 shown in FIG. 5.

Figure 7:
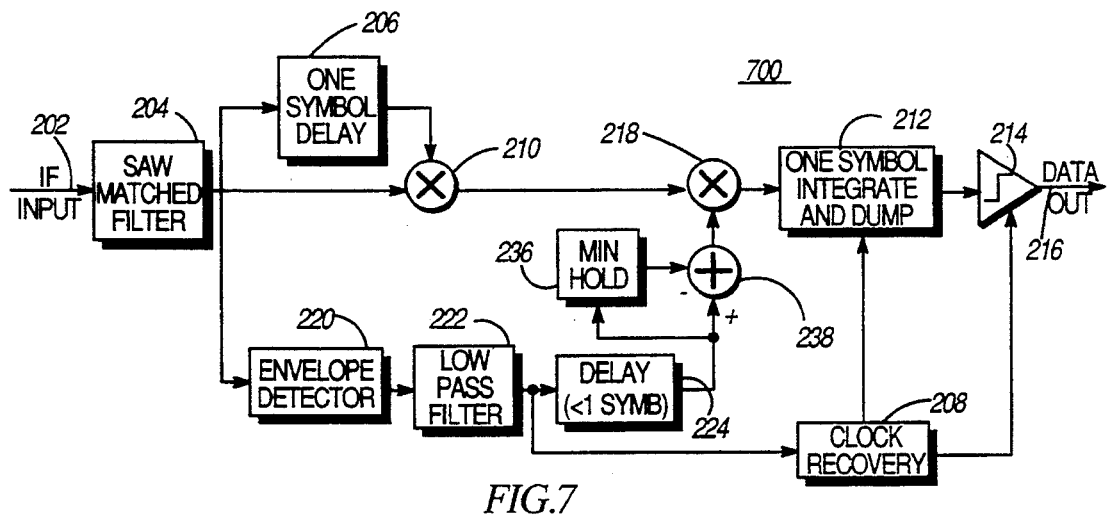
FIG. 7 is a diagram showing the preferred embodiment improved multipath combiner shown in FIG. 2 with a minimum hold circuit included in accordance with the present invention.

It will also be appreciated by those skilled in the art that the "minimum hold" circuit 236 shown in FIG. 5 can also be incorporated into the simpler multipath combiner 200 of FIG. 2, as is shown by the multipath combiner 700 depicted in FIG. 7. In many respects, this may be the most "cost effective" multipath combiner, especially for systems which use very short spreading code sequences. The rather small correlation peak produced by this short spread code leads to a relatively high cross-correlation "noise floor". Since the envelope of this cross-correlation noise is nearly constant (assuming that the proper type of spread code is used) it is relatively easy to estimate this noise floor level and subtract it off. This will "shut off" the multipath combiner 700 during the gaps between signal peaks, so that this cross-correlation noise does not corrupt the signal being delivered to the data slicer 214.

Figure 8:
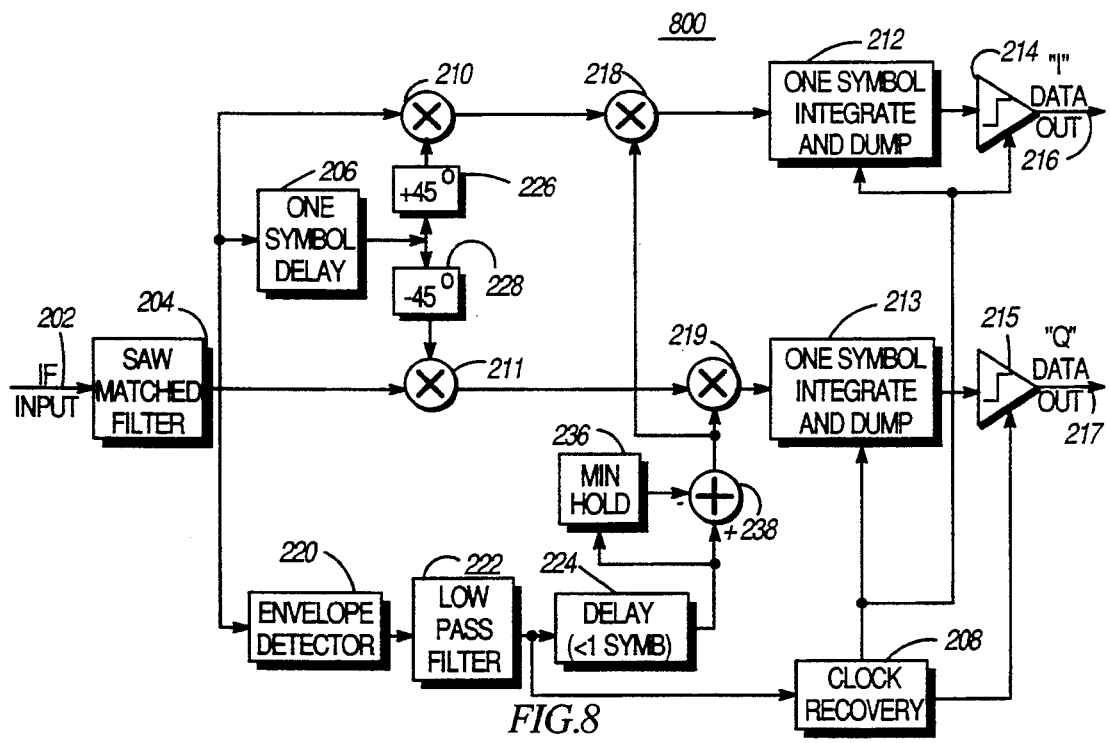
FIG. 8 is a diagram showing the alternative preferred embodiment improved multipath combiner shown in FIG. 3 with a minimum hold circuit included in accordance with the present invention.

It will also be appreciated by those skilled in the art that the "minimum hold" circuit 236 shown in FIG. 5 can also be incorporated into the more complex multipath combiner 300 of FIG. 3, as is shown by the multipath combiner 800 depicted in FIG. 8.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A spread-spectrum signal multipath combiner, comprising:
   (a) matched filtering means for detecting an envelope of an input differential phase shift keyed signal communicated over a communication channel;
   (b) envelope detector means, operatively coupled to the matched filtering means, for detecting a replica of a multipath echo structure for the communication channel within the detected envelope;
   (c) combiner means, operatively coupled to the matched filtering means and the envelope detector means, for combining the input differential phase shift keyed signal with the detected replica of the multipath echo structure for the communication channel such that a multipaten echo structure weighted differential phase shift keyed signal is formed; and
   (d) integrator means, operatively coupled to the combiner means, for integrating the multipath echo structure weighted differential phase shift keyed signal over a one symbol period centered on a correlation peak such that power from a plurality of signal paths determines an output data bit.

2. The combiner of claim 1 wherein the input differential phase shift keyed signal is selected from the group consisting of differential binary phase shift keyed signal and differential quadrature phase shift keyed signal.

3. The combiner of claim 1 wherein the communication channel is selected from the group consisting of an electronic data bus, radio communication link, wireline and optical fiber link.

4. The combiner of claim 1 wherein the envelope detector means comprises a square law based envelope detector.

5. The combiner of claim 1 wherein the envelope detector means includes a low pass filter having a cutoff frequency between the frequency of the input differential phase shift keyed signal and a spreading code frequency associated with the input differential phase shift keyed signal.

6. The combiner of claim 1 wherein the envelope detector means. includes a delay means for delaying the detected replica of the multipath echo structure up to one symbol period such that the detected replica of the multipath echo structure is time aligned with the input differential phase shift keyed signal.

7. The combiner of claim 1 wherein the envelope detector means includes a recirculating exponential averager means for reducing noise in the detected replica of the multipath echo structure.

8. The combiner of claim 7 wherein the recirculating exponential averager means comprises a one symbol long tapped delay line, attenuator, and summer which continuously circulate a one symbol long replica of an average detected replica of the multipath echo structure.

9. The combiner of claim 1 wherein the envelope detector, means includes a minimum hold means for estimating and subtracting a multipath echo structure noise floor from the detected replica of the multipath echo structure.

10. The combiner of claim 1 wherein the matched filtering means comprises descrambling means for descrambling with a spreading code a spread-spectrum signal received from over the communication channel into the input differential phase; shift keyed signal.

11. The combiner of claim 1:
   (a) further comprising delay means, operatively coupled to the matched filtering means, for delaying the input differential phase shift keyed signal by one symbol period;
   (b) wherein the combiner means is further operatively coupled to the delay means, the combiner means comprising a first and second combiner, the first combiner being configured to combine the input differential phase shift keyed signal with the delayed input differential phase shift keyed signal to form a combined input differential phase shift keyed signal, the second combiner being configured to form multipath echo structure weighted differential phase shift keyed signal by combining the combined input differential phase shift keyed signal with the detected replica of the multipath echo structure for the communication channel; and (c) further comprising detector means, operatively coupled to the integrator means, for detecting an output data bit from the integrated multipath echo structure weighted differential phase shift keyed signal.

12. A spread-spectrum signal multipath combiner, comprising:

(a) matched filtering means for detecting an envelope of an input differential phase shift keyed signal from a spread-spectrum signal received from over a communication channel;

(b) first delay means, operatively coupled to the matched filtering means, for delaying the input differential phase shift keyed signal by one symbol period;

(c) first combiner means, operatively coupled to the matched filtering means and the first delay means, for combining the input differential phase shift keyed signal with the delayed input differential phase shift keyed signal to form a combined input differential phase shift keyed signal (d) square law based envelope detector means, operatively coupled to the matched filtering means, for detecting a replica of a multipath echo structure for the communication channel within the detected envelope;

(e) low pass filter being operatively coupled to the square law based envelope detector means, the low pass filter having a cutoff frequency between the frequency of the input differential phase shift keyed signal and a spreading code frequency associated with the input differential phase shift keyed signal;

(f) second delay means, operatively coupled to the low pass filter for delaying a low pass filtered detected replica of the multipath echo structure up to one symbol period such that the detected replica of the multipath echo structure is time aligned with the combined input differential phase shift keyed signal;

(g) second combiner means, operatively coupled to the first combiner means and the second delay means, for combining the combined input differential phase shift keyed signal with the delayed low pass filtered detected replica of the multipath echo structure for the communication channel such that a multipath echo structure weighted differential phase shift keyed signal is formed;

(h) integrator means, operatively coupled to the combiner means, for integrating the multipath echo structure weighted differential phase shift keyed signal over a one symbol period centered on a correlation peak such that power from a plurality of signal paths determines an output data bit; and (i) detector means, operatively coupled to the integrator means, for detecting the output data bit from the integrated multipath echo structure weighted differential phase shift keyed signal.

13. A spread-spectrum signal multipath combiner, comprising:

(a) matched filtering means for detecting an envelope of an input differential quadrature phase shift keyed signal communicated over a communication channel;

(b) envelope detector means, operatively coupled to the matched filtering means, for detecting a replica of a multipath echo structure for the communication channel within the detected envelope;

(c) first combiner means, operatively coupled to the matched filtering means and the envelope detector means, for combining an I-channel component of the input differential quadrature phase shift keyed signal with the detected replica of the multipath echo structure for the communication channel such that a multipath echo structure weighted I-channel differential quadrature phase shift keyed signal is formed;

(d) first integrator means, operatively coupled to the first combiner means, for integrating the multipath echo structure weighted I-channel differential phase shift keyed signal over a one symbol period centered on a correlation peak such that power from a plurality of signal paths determines an output I-channel data bit;

(e) second combiner means, operatively coupled to the matched filtering means and the envelope detector means, for combining a Q-channel component of the input differential quadrature phase shift keyed signal with the detected replica of the multipath echo structure for the communication channel such that a multipath echo structure weighted Q-channel differential quadrature phase shift keyed signal is formed; and (f) second integrator means, operatively coupled to the first combiner means, for integrating the multipath echo structure weighted Q-channel differential phase shift keyed signal over a one symbol period centered on a correlation peak such that power from a plurality of signal paths determines an output Q-channel data bit.

14. The combiner of claim 13 wherein the envelope detector means comprises a square law based envelope detector.

15. The combiner of claim 13 wherein the envelope detector means includes a low pass filter having a cutoff frequency between the frequency of the input differential quadrature phase shift keyed signal and a spreading code frequency associated with the input differential quadrature phase shift keyed signal.

16. The combiner of claim 13 wherein the envelope detector means includes a delay means for delaying the detected replica of the multipath echo structure up to one symbol period such that the detected replica of the multipath echo structure is time aligned with the input differential quadrature phase shift keyed signal.

17. The combiner of claim 13 wherein the envelope detector means includes a recirculating exponential averager means for reducing noise in the detected replica of the multipath echo structure.

18. The combiner of claim 17 wherein the recirculating exponential averager means comprises a one symbol long tapped delay line, attenuator, and summer which continuously circulate a one symbol long replica of an average detected replica of the multipath echo structure.

19. The combiner of claim 13 wherein the envelope detector means includes a minimum hold means for estimating and subtracting a multipath echo structure noise floor from the detected replica of the multipath echo structure.

20. The combiner of claim 13 wherein the matched filtering means comprises descrambling means for descrambling with a spreading code a spread-spectrum signal received from over the communication channel into the input differential quadrature phase shift keyed signal.

21. The combiner of claim 13:
(a) further comprising delay means, operatively coupled to the matched filtering means for delaying the input differential quadrature phase shift keyed signal by one symbol period;
(b) wherein the first and second combiner means is further operatively coupled to the delay means each combined means comprising a differential and echo combiner the differential combiner being configured to combine the input differential quadrature phase shift keyed signal with the delayed input differential quadrature phase shift keyed signal to form the I-channel component and the Q-channel component combined input differential quadrature phase shift keyed signal, respectively, each echo combiner being configured to form the multipath echo structure weighted I-channel and Q-channel differential phase shift keyed signal by combining the I-channel component arid the Q-channel component combined input differential phase shift keyed signal with the detected replica of the multipath echo structure for the communication channel, respectively; and
(c) further comprising first and second detector means operatively coupled to the first and second integrator means, respectively, for detecting an output I-channel and Q-channel data bit from the integrated multipath echo structure weighted I-channel and Q-channel differential phase shift keyed signal, respectively.

* * * * *

UNITED STATES PATENT AND TRADEMARK OFFICE
CERTIFICATE OF CORRECTION

PATENT NO. : 5,353,301
DATED : October 4, 1994
INVENTOR(S) : James E. Mitzlaff

It is certified that error appears in the above-indentified patent and that said Letters Patent is hereby corrected as shown below:

Column 10, line 28: "detector means. includes" should be --detector means includes--.

Column 10, line 44: "detector, means includes" should be --detector means includes--.

Column 10, line 52: "differential phase; shift" should be --differential phase shift--.

Column 10, line 66: "to form multipath" should be --to form the multipath--.

Column 11, line 36: "low pass filter for" should be --low pass filter, for--.

Column 13, line 5: "filtering means for" should be --filtering means, for--.

Column 13, line 9: "the delay means" should be --the delay means,--.

Column 13, line 10: "each combined means" should be --each combiner means--.

Column 13, line 11: "echo combiner the" should be --echo combiner, the--.

Column 14, line 4: "component arid" should be --component and--.

UNITED STATES PATENT AND TRADEMARK OFFICE
CERTIFICATE OF CORRECTION

PATENT NO. : 5,353,301

DATED : October 4, 1994

INVENTOR(S) : James E. Mitzlaff

It is certified that error appears in the above-indentified patent and that said Letters Patent is hereby corrected as shown below:

Column 14, line 11: "means operatively" should be —means, operatively—.

Signed and Sealed this

Twenty-eight Day of February, 1995

Attest:

BRUCE LEHMAN

Attesting Officer     Commissioner of Patents and Trademarks